United States Patent
Okimoto et al.

(10) Patent No.: US 10,088,706 B2
(45) Date of Patent: *Oct. 2, 2018

(54) SURFACE LIGHT SOURCE DEVICE AND LIQUID CRYSTAL DISPLAY DEVICE

(71) Applicant: Mitsubishi Electric Corporation, Tokyo (JP)

(72) Inventors: Nami Okimoto, Tokyo (JP); Saki Maeda, Tokyo (JP); Eiji Niikura, Tokyo (JP); Tomohiko Sawanaka, Tokyo (JP); Masaaki Takeshima, Tokyo (JP); Ikuo Nagashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 14/822,393

(22) Filed: Aug. 10, 2015

(65) Prior Publication Data

US 2016/0054517 A1 Feb. 25, 2016

(30) Foreign Application Priority Data

Aug. 20, 2014 (JP) .................. 2014-167207

(51) Int. Cl.
*G02F 1/1335* (2006.01)
*F21V 8/00* (2006.01)

(52) U.S. Cl.
CPC ....... *G02F 1/133605* (2013.01); *G02B 6/001* (2013.01); *G02B 6/0055* (2013.01);
(Continued)

(58) Field of Classification Search
CPC .. G02B 6/0088; G02B 6/0073; G02B 6/0078; G02B 6/0055; G02B 6/001;
(Continued)

(56) References Cited

U.S. PATENT DOCUMENTS 7,661,862 B2  2/2010 Lee et al.
7,719,016 B2  5/2010 Nada et al.
(Continued)

FOREIGN PATENT DOCUMENTS

CN   101978210 A    2/2011
CN   102224448 A   10/2011
(Continued)

*Primary Examiner* — Charles Chang
(74) *Attorney, Agent, or Firm* — Birch, Stewart, Kolasch & Birch, LLP

(57) ABSTRACT

A surface light source device includes a laser beam source, a laser beam guide rod for converting a laser beam into first linear light, an LED light source, an LED light guide rod for converting LED light into second linear light extended in the same direction as the first linear light, a reflecting bar for reflecting the first linear light and the second linear light, and a light reflecting portion formed in a box shape and having an opening portion with an emission side opened and a reflecting surface on an inside of the box shape. The first linear light and the second linear light are reflected by the reflecting bar and the reflecting surface, and are emitted from the opening portion.

7 Claims, 8 Drawing Sheets

(52) U.S. Cl.
CPC ......... *G02B 6/0066* (2013.01); *G02B 6/0078* (2013.01); *G02F 1/133603* (2013.01); *G02F 1/133615* (2013.01); *G02F 2001/133607* (2013.01)

(58) Field of Classification Search
CPC ............. G02B 6/0066; G02F 1/133524; G02F 1/133603; G02F 1/133605; G02F 1/133615; G02F 2001/133607
USPC ........................................................ 349/65
See application file for complete search history.

(56) References Cited

U.S. PATENT DOCUMENTS

| | | | |
|---|---|---|---|
| 9,588,373 B2 * | 3/2017 | Okimoto | ............... G02B 6/0076 |
| 2011/0018012 A1 | 1/2011 | Tanaka et al. | |
| 2011/0199352 A1 | 8/2011 | Wheatley et al. | |
| 2012/0106127 A1 | 5/2012 | Hattori et al. | |
| 2012/0169941 A1 | 7/2012 | Yokota | |
| 2012/0176786 A1 | 7/2012 | Presley et al. | |
| 2013/0033901 A1 | 2/2013 | Nishitani et al. | |
| 2015/0160394 A1 | 6/2015 | Nakano et al. | |
| 2015/0330593 A1 * | 11/2015 | Larsen | ................. B60Q 1/2607 362/511 |

FOREIGN PATENT DOCUMENTS

| | | |
|---|---|---|
| CN | 102844606 A | 12/2012 |
| CN | 102844608 A | 12/2012 |
| JP | 2004-311353 A | 11/2004 |
| JP | 2006-286906 A | 10/2006 |
| JP | 2008-192598 A | 8/2008 |
| JP | 2012-99362 A | 5/2012 |
| WO | WO 2012/133118 A1 | 10/2012 |
| WO | WO 2014/020844 A1 | 2/2014 |

* cited by examiner

F I G. 1
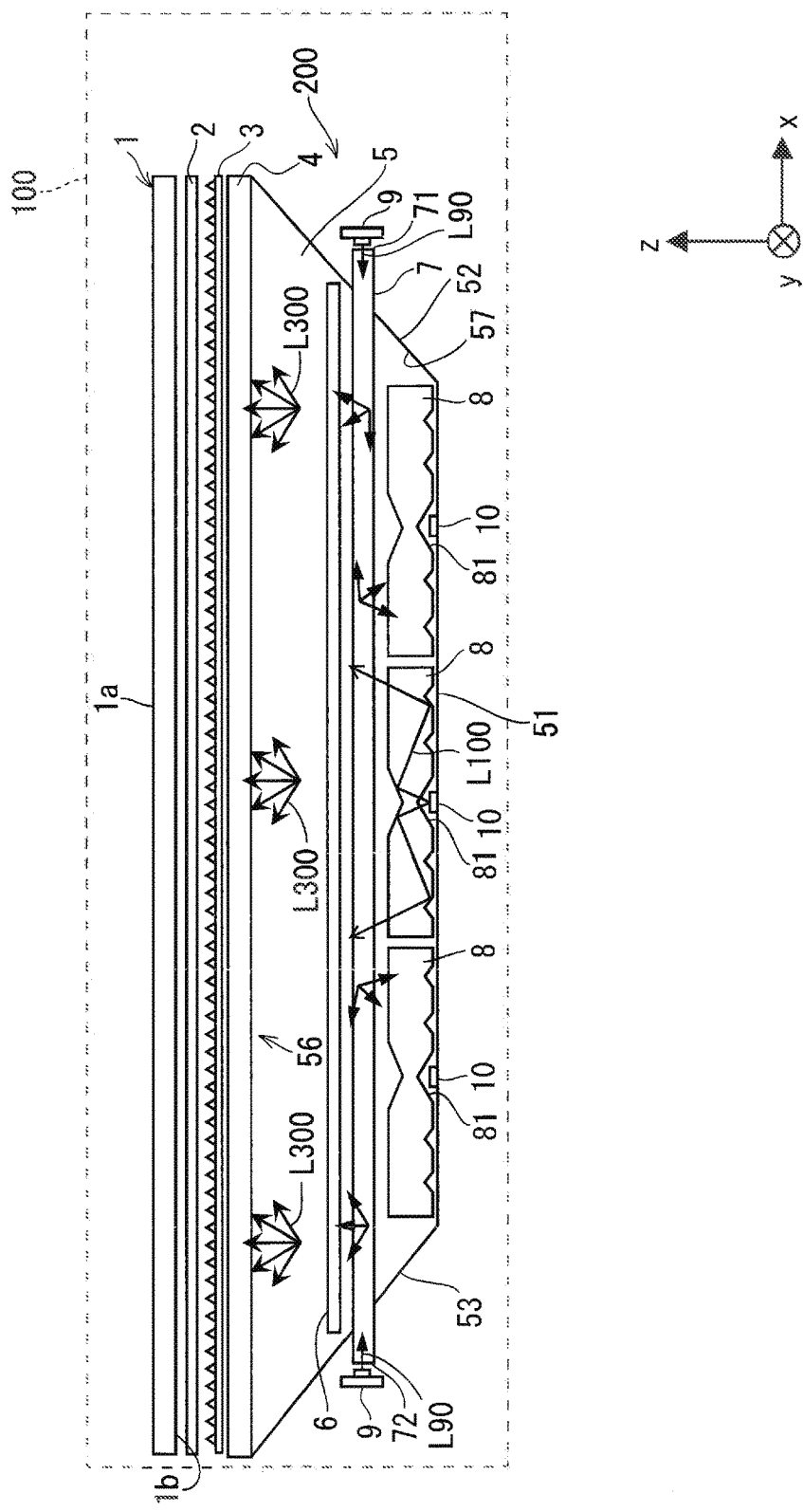

F I G. 4
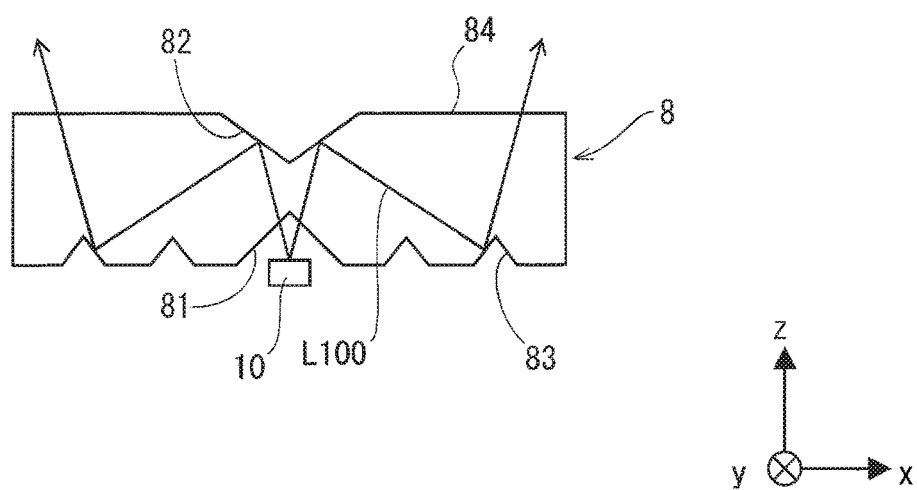

SURFACE LIGHT SOURCE DEVICE AND LIQUID CRYSTAL DISPLAY DEVICE

BACKGROUND OF THE INVENTION

Field of the Invention

The present invention relates to a surface light source device for illuminating a back surface of a liquid crystal display element by two types of light sources having different characteristics, thereby displaying an image on the liquid crystal display element, and a liquid crystal display device including the surface light source device.

Description of the Background Art

A liquid crystal display element provided in a liquid crystal display device does not emit light by itself. For this reason, the liquid crystal display device includes a backlight device (a surface light source device) as a light source for illuminating the liquid crystal display element at a back surface side of the liquid crystal display element.

Moreover, the liquid crystal display element includes a color filter and transmits, through a color filter, only light having a part of wavelengths in light emitted from a fluorescent lamp for emitting white light in a continuous spectrum, thereby extracting display colors of red, green and blue to perform color representation. In the case in which only light in a part of wavelength bands is cut out of light source light in the continuous spectrum to obtain the display color, thus, a transmission wavelength band of the color filter provided in the liquid crystal display element should be set to be narrower if color purity of the display color is to be increased in order to enlarge a color reproduction range. For this reason, if the color purity of the display color is to be increased, there is a problem in that a quantity of light transmitted through the color filter is decreased, resulting in reduction in a luminance.

A fluorescent lamp to be generally employed as a light source of a backlight device has a light emission spectrum with a peak in a wavelength shifted to an orange color of approximately 615 nm in a red wavelength range based on a characteristic of a phosphor. If the color purity is to be increased in a wavelength region of 630 to 640 nm which is preferable as pure red in the red color, therefore, there is a problem in that the quantity of transmitted light is extremely reduced, resulting in significant reduction in a luminance. In order to enlarge the color reproduction range while minimizing a light loss caused by the color filter, it is necessary to employ a light source for emitting light having a narrow wavelength bandwidth. In other words, it is necessary to employ a light source for emitting light having high color purity.

As a measure for solving the problems, in recent years, there has been proposed a liquid crystal display device including, as a light source, a monochromatic LED or laser having a narrow wavelength width, that is, high color purity. In particular, the laser has excellent monochromaticity and high light emission efficiency. Therefore, it is possible to obtain a liquid crystal display device having a large color reproduction area, providing an image of high quality with a high luminance, and having low power consumption.

In recent years, the light emission efficiency of the LED has also been enhanced. For this reason, a backlight device for a liquid crystal display element or the like has also used a technique for using three types of LEDs that respectively emit light having red (R), green (G), and blue (B) which are three primary colors of light and mixing colors of RGB light emitted from the three types of LEDs, thereby obtaining white light.

In order to enhance utilization efficiency of light emitted from a light source, furthermore, there has been used a directly under type backlight device for directly supplying light from a back surface to a liquid crystal display element.

In the liquid crystal display device including the backlight device, there has been desired technological development capable of providing a surface light source device having a simple structure through devise of a structural part and less luminance unevenness and color irregularity with high quality.

For example, Japanese Patent Application Laid-Open No. 2006-286906 discloses the technology for attaching a light emitting diode device for adjusting light traveling along a central axis of a lens to the lens covering a light emitting diode chip or a periphery thereof, thereby improving luminance unevenness and color irregularity in a liquid crystal display device.

The light emitting diode device described in the Japanese Patent Application Laid-Open No. 2006-286906 is designed for a divergence angle of an LED. The light emitting diode device can obtain white light without unevenness by mixture of the red LED light, the green LED light, and the blue LED light through direct adjustment of a direction of the light traveling along the central axis of the lens, that is, light traveling toward a display surface.

In contrast with a liquid crystal display device in which light sources having greatly different divergence angles are mixed, however, the way for propagation of light emitted from the light emitting diode device is varied due to a difference in light distribution possessed by the light source so that a difference is generated in the distribution of light illuminating the display surface every light source in the same light emitting diode device. In particular, a distribution difference between display surfaces having different colors causes color irregularity and is thus recognized visually.

A laser is a light source for emitting light having a narrow wavelength bandwidth. By using the laser, it is possible to enhance color reproductivity. However, the laser is a light source having a very small divergence angle, and is difficult to have equivalent expansion to LED light with a large divergence angle by a lens and the light emitting diode device through the same method as the LED. When distribution of a laser beam is different from that of the LED light over a display surface, luminance unevenness and color irregularity are caused.

In other words, in the case in which an LED light source and a laser beam source having a different light emission characteristic from that of the LED light source are to be simultaneously used in a surface light source device, it is necessary to match the ways of light expansion from the light source. It is difficult to create a uniform surface light source with the same structure. When two types of light sources are each caused to have structures for creating surface light sources, moreover, the structures are made complicated so that a manufacturing cost is increased.

SUMMARY OF THE INVENTION

It is an object of the present invention to provide a surface light source device and a liquid crystal display device which can display an image of high quality with a simple structure when simultaneously using two types of light sources having different light emission characteristics from each other.

The surface light source device according to the present invention includes a first light source for emitting first light, a first light guide rod, a second light source, a second light guide rod, a reflecting bar, and a reflecting portion. The first light guide rod has a first light incident surface, and causes the first light to be incident from the first light incident surface and converts the first light into first linear light. The second light source emits second light having a greater divergence angle than that of the first light. The second light guide rod has a second light incident surface and causes the second light to be incident from the second light incident surface and converts the second light into second linear light extended in the same direction as the first linear light. The reflecting bar is disposed on emission sides of the first light guide rod and the second light guide rod and reflects the first linear light and the second linear light. The reflecting portion is formed in a box shape such that the first light guide rod, the second light source, the second light guide rod, and the reflecting bar can be accommodated, and has an opening portion with the emission side opened and a reflecting surface for reflecting the first linear light and the second linear light on an inside of the box shape. The first light incident surface is an end face in a longitudinal direction of the first light guide rod, the first light source is disposed in an opposed position to the first light incident surface, the second light incident surface is a surface formed along a longitudinal direction of the second light guide rod at an opposite side to the emission side, the second light source is disposed in an opposed position to the second light incident surface, and the first linear light and the second linear light are reflected by the reflecting bar and the reflecting surface and are emitted from the opening portion.

The liquid crystal display device according to the present invention includes a surface light source device, and a liquid crystal panel for displaying an image by illumination of light from the surface light source device.

The first light emitted from the first light source is converted into the first linear light by the first light guide rod and the second light emitted from the second light source is converted into the second linear light extended in the same direction as the first linear light by the second light guide rod. The first linear light and the second linear light spread by reflection through the reflecting bar. Therefore, it is possible to obtain illumination light having uniform planar distribution. Moreover, the first linear light and the second linear light are reflected by the reflecting bar and spread with color mixture in the reflecting portion. Therefore, it is possible to prevent color unevenness from being caused by an intensity distribution difference between the first light and the second light.

Thus, it is possible to guide the light emitted from the first light source and the light emitted from the second light source without waste when simultaneously using two types of light sources having different light emission characteristics from each other. Therefore, utilization efficiency of the light can be increased so that an image of high quality can be displayed. Moreover, the display of the image of high quality can be implemented with a simple structure.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view schematically showing an example of a structure of a liquid crystal display device according to a preferred embodiment;

FIG. 4 is a schematic view schematically showing a structure of an LED light guide rod;

DESCRIPTION OF THE PREFERRED EMBODIMENTS

Preferred Embodiment

Figure 2:
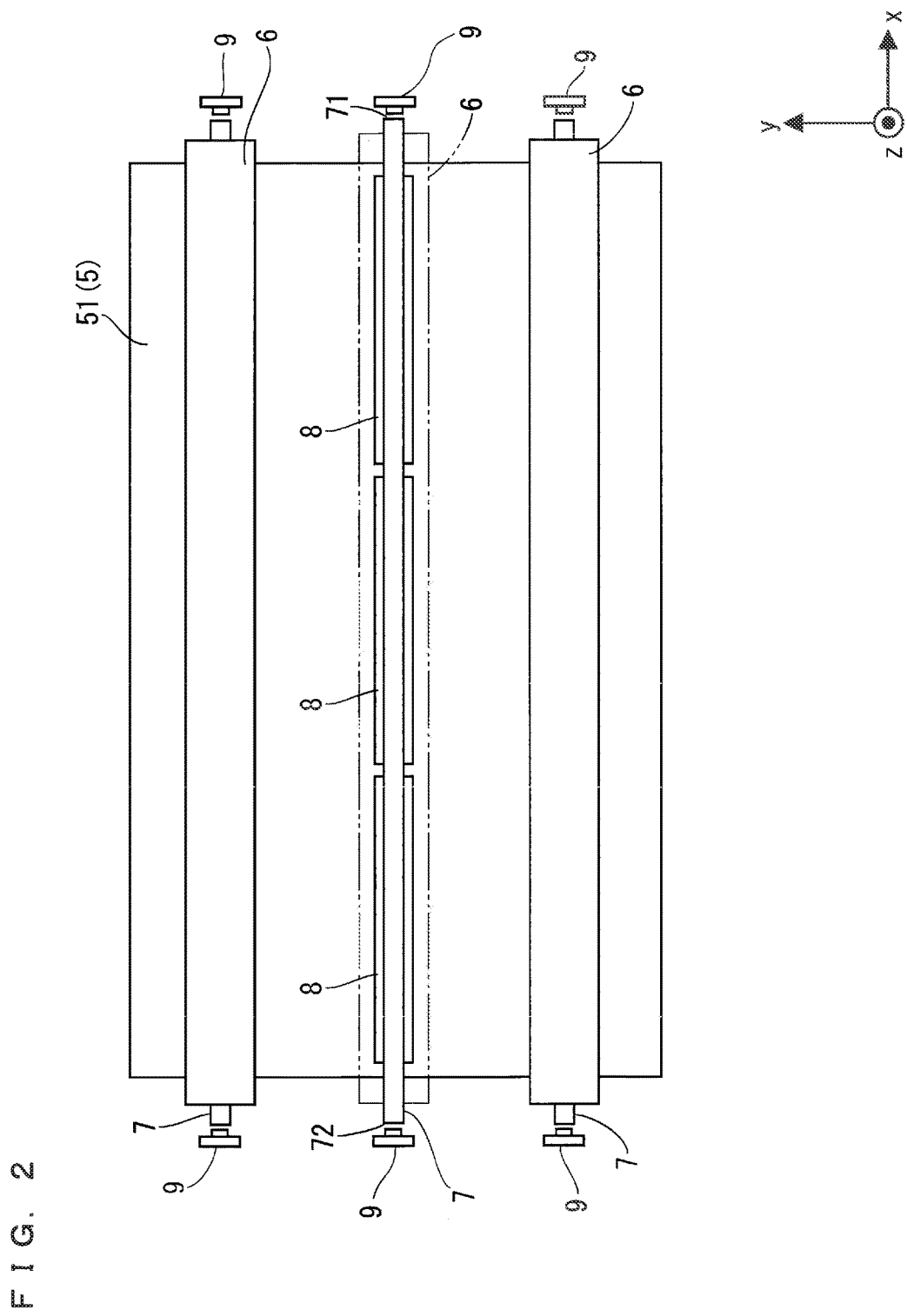
FIG. 2 is a view schematically showing an example of a structure of a surface light source device.
Figure 3:
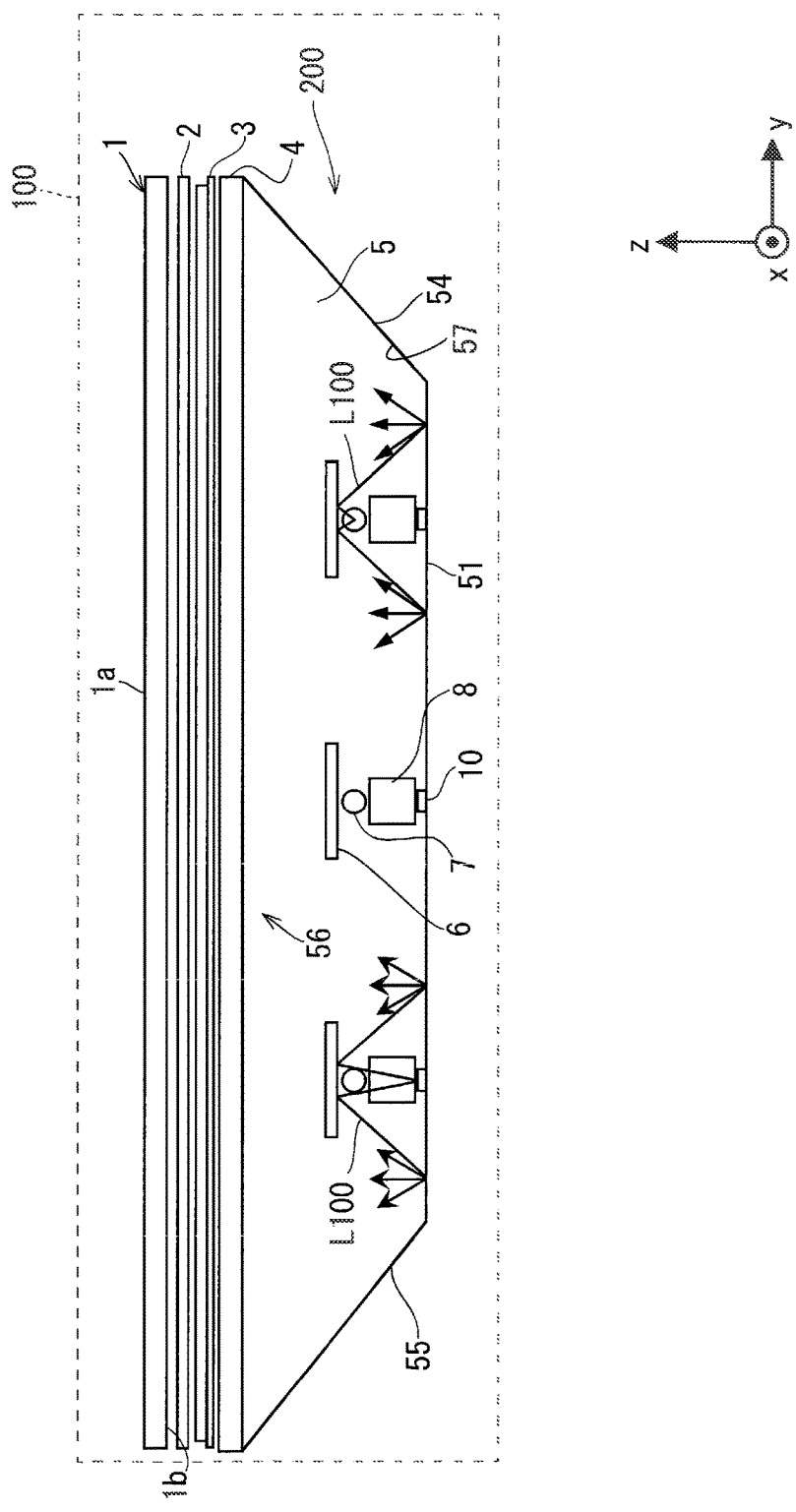
FIG. 3 is a view schematically showing an example of the structure of the liquid crystal display device.

A preferred embodiment according to the present invention will be described below with reference to the drawings. FIG. 1 is a view schematically showing an example of a structure of a liquid crystal display device 100 according to the preferred embodiment, FIG. 2 is a view schematically showing an example of a structure of a surface light source device 200, and FIG. 3 is a view schematically showing an example of the structure of the liquid crystal display device 100.

Figure 5:
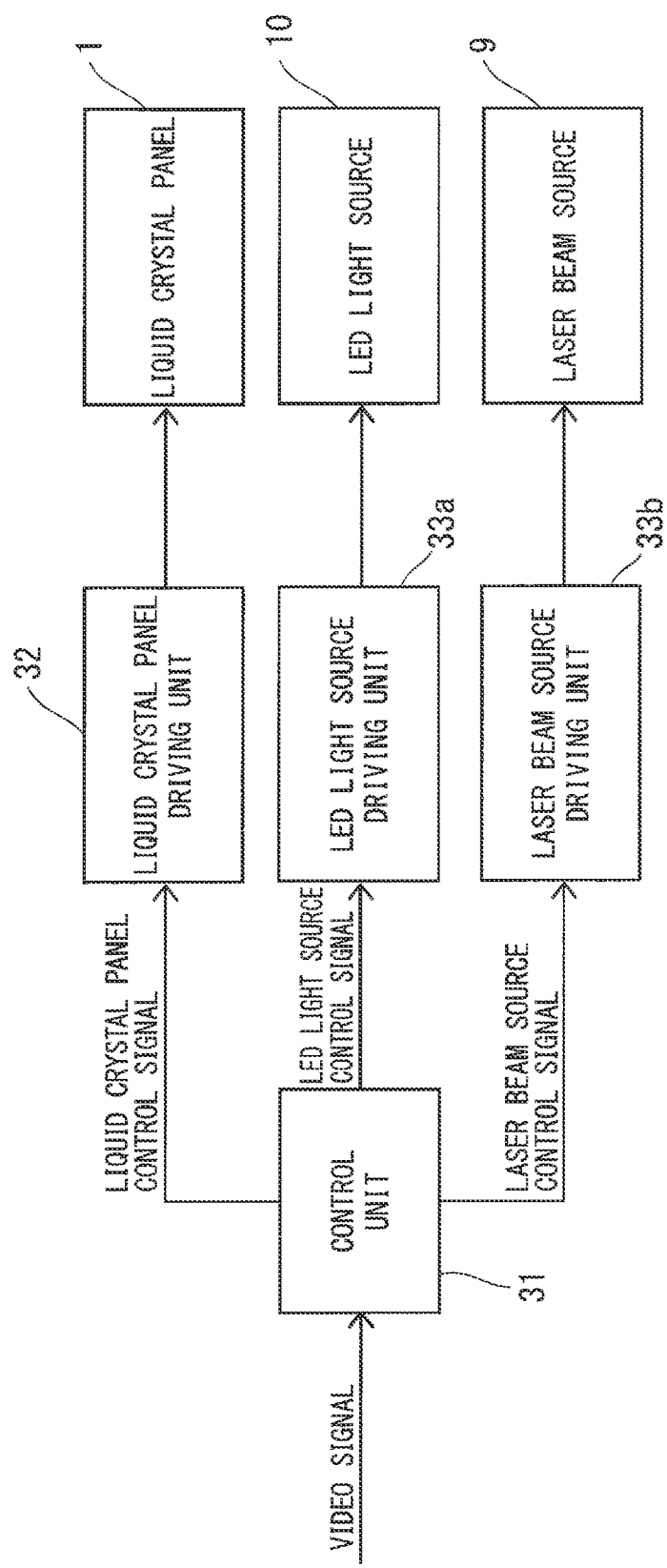
FIG. 5 is a block diagram showing the liquid crystal display device.

As shown in FIG. 1, the liquid crystal display device 100 includes a transmission type liquid crystal panel 1 formed of a liquid crystal display element, an optical sheet 2, an optical sheet 3, and the surface light source device 200. Moreover, although not illustrated in FIG. 1, the liquid crystal display device 100 further includes a control unit 31, a liquid crystal panel driving unit 32, an LED light source driving unit 33*a*, and a laser beam source driving unit 33*b* as shown in FIG. 5. The details of the control unit 31, the liquid crystal panel driving unit 32, the LED light source driving unit 33*a*, and the laser beam source driving unit 33*b* will be described later.

The surface light source device 200 is disposed on a back surface 1*b* side of the liquid crystal panel 1 and serves to illuminate the back surface 1*b* of the liquid crystal panel 1 through the optical sheet 3 and the optical sheet 2 disposed between the surface light source device 200 and the liquid crystal panel 1. The liquid crystal panel 1 displays an image through illumination of light emitted from the surface light source device 200 onto the back surface 1*b*.

The surface light source device 200 includes a thin plate-shaped diffusing plate 4, a reflecting bar 6, a laser beam guide rod 7 (a first light guide rod), an LED light guide rod 8 (a second light guide rod), a laser beam source 9 (a first light source), an LED light source 10 (a second light source), and a light reflecting portion 5 (a reflecting portion).

For the sake of easy explanation, xyz rectangular coordinate systems are defined in the following manner and coordinate axes of the xyz rectangular coordinate systems are shown in each of the drawings. A long-side direction of the display surface 1*a* of the liquid crystal panel 1 is set to be an x-axis direction (a transverse direction in FIG. 1). A short-side direction of the display surface 1*a* of the liquid crystal panel 1 is set to be a y-axis direction (a perpendicular direction to the drawing sheet of FIG. 1). A perpendicular direction to an x-y plane including the x axis and the y axis is set to be a z-axis direction (a vertical direction in FIG. 1).

In FIG. 1, moreover, a direction from a side portion 53 toward a side portion 52, which is provided at a side opposite to the side portion 53, of the light reflecting portion 5 (a direction from the left toward the right of the drawing sheet) is set to be a positive direction of an x axis (a +x-axis direction). An opposite direction to the +x-axis direction is set to be a negative direction of the x axis (a −x-axis direction). In FIG. 1, moreover, a direction viewed backward from the front of the drawing sheet is set to be a positive direction of a y axis (a +y-axis direction). An opposite direction to the +y-axis direction is set to be a negative direction of the y axis (a −y-axis direction). In FIG. 1, furthermore, a direction from the diffusing plate 4 toward the liquid crystal panel 1 (a direction from a lower part toward an upper part of the drawing sheet) is set to be a positive direction of a z axis (a +z-axis direction). An opposite direction to the +z-axis direction is set to be a negative direction of the z axis (a −z-axis direction).

As shown in FIG. 1, in the liquid crystal display device 100, the liquid crystal panel 1, the optical sheet 2, the optical sheet 3, and the surface light source device 200 are disposed in order from the positive direction toward the negative direction of the z axis. The optical sheet 2 has a function for suppressing an optical influence such as fine illumination unevenness of illumination light L300. The optical sheet 3 has a function for directing the transmitted illumination light L300 toward the back surface 1b of the liquid crystal panel 1.

The liquid crystal panel 1 includes the display surface 1a, the back surface 1b, and a liquid crystal layer (not shown). The display surface 1a is provided on an end face at the +z-axis side of the liquid crystal panel 1, and the back surface 1b is provided on an end face at the −z-axis side of the liquid crystal panel 1. The liquid crystal layer is provided between the display surface 1a and the back surface 1b in the liquid crystal panel 1.

The display surface 1a of the liquid crystal panel 1 is parallel with an x-y plane. The liquid crystal layer of the liquid crystal panel 1 has a planar structure extended in a parallel direction with the x-y plane. The display surface 1a of the liquid crystal panel 1 usually takes a rectangular shape, and two adjacent sides of the display surface 1a (a long side provided in the x-axis direction and a short side provided in the y-axis direction) are orthogonal to each other. Although description will be given on the assumption that the display surface 1a of the liquid crystal panel 1 takes the rectangular shape in the present preferred embodiment, the shape of the display surface 1a of the liquid crystal panel 1 is not restricted thereto but other shapes may be taken.

As shown in FIGS. 1 and 3, the light reflecting portion 5 is formed in a box shape such that the laser beam guide rod 7, the LED light source 10, the LED light guide rod 8, and the reflecting bar 6 can be accommodated. More specifically, the light reflecting portion 5 includes a back portion 51 which is parallel with the x-y plane, four side portions 52, 53, 54 and 55, and an opening portion 56. Herein, FIG. 3 is a schematic view showing the liquid crystal display device 100 of FIG. 1 as seen from the x-axis direction side.

The side portion 52 is disposed on an end in the +x-axis direction of the back portion 51 and the side portion 53 is disposed on an end in the −x-axis direction of the back portion 51. The side portion 54 is disposed on an end in the +y-axis direction of the back portion 51 and the side portion 55 is disposed on an end in the −y-axis direction of the back portion 51. Main surfaces of the back portion 51 (inner and outer surfaces) are smaller planes than the display surface 1a of the liquid crystal panel 1. For this reason, the four side portions 52, 53, 54 and 55 are gradually tilted inward toward the back portion 51. The opening portion 56 is provided in a normal direction of the back portion 51 in such a manner that an emission side of the light reflecting portion 5 is opened.

An inner surface of the light reflecting portion 5 is a reflecting surface 57. The reflecting surface 57 has a function for reflecting and diffusing light. Herein, the inner surface of the light reflecting portion 5 is an inner surface of the box shape of the light reflecting portion 5. In other words, the reflecting surface 57 indicates a surface in the +z-axis direction of the back portion 51, a surface in the −x-axis direction of the side portion 52, a surface in the +x-axis direction of the side portion 53, a surface in the −y-axis direction of the side portion 54, and a surface in the +y-axis direction of the side portion 55. The reflecting surface 57 can be formed by disposing a light reflection sheet using a resin such as polyethylene terephthalate as a base material on the whole inner surface of the light reflecting portion 5, for example. Moreover, the reflecting surface 57 may be formed by depositing a metal onto the whole inner surface of the light reflecting portion 5.

The diffusing plate 4 is disposed on the +z-axis direction side of the light reflecting portion 5. The diffusing plate 4 is disposed in the +z-axis direction of the opening portion 56. The diffusing plate 4 is disposed to cover the opening portion 56. The light reflecting portion 5 and the diffusing plate 4 form a hollow box shape having a reflecting surface (the reflecting surface 57) and a diffusion surface (the surface in the −z-axis direction of the diffusing plate 4).

The laser beam guide rod 7 is disposed in penetration through an inner part of the hollow box shape in the x-axis direction. Herein, the x-axis direction is set to include the +x-axis direction and the −x-axis direction, and the same also applies to the y-axis direction and the z-axis direction. The LED light guide rod 8 is disposed on the −z-axis direction side from the laser beam guide rod 7 in the hollow box shape. The LED light source 10 is disposed on the surface in the +z-axis direction of the back portion 51. Moreover, the reflecting bar 6 is disposed on the +z-axis direction side from the laser beam guide rod 7 in the hollow box shape. In other words, the surface light source device 200 has such a structure as to have the reflecting bar 6, the laser beam guide rod 7, the LED light guide rod 8, and the LED light source 10 in order from the positive direction toward the negative direction of the z axis in the hollow box shape including the light reflecting portion 5 and the diffusing plate 4.

As shown in FIGS. 1 to 3, the LED light source 10, the LED light guide rod 8, the laser beam guide rod 7, and the reflecting bar 6 are disposed in the z-axis direction. Furthermore, the LED light source 10, the LED light guide rod 8, the laser beam guide rod 7, and the reflecting bar 6 disposed in the z-axis direction are provided in plural numbers in the y-axis direction.

The laser beam guide rod 7 is disposed in penetration through the side portions 52 and 53. In other words, the laser beam guide rod 7 is held on the light reflecting portion 5 with ends of the laser beam guide rod 7 protruded outward. More specifically, the side portions 52 and 53 are provided with holes each having a size equal to or larger than the end in the x-axis direction of the laser beam guide rod 7. Positions of the holes in the side portions 52 and 53 through which the laser beam guide rod 7 is to be inserted are the same coordinate positions on the y-z plane. The laser beam guide rod 7 is inserted through the holes provided on the side portions 52 and 53 and is thus attached to the light reflecting portion 5. A light incident surface 71 of the laser beam guide rod 7 is disposed on the +x-axis direction side from the side portion 52. Moreover, the light incident surface 72 is disposed on the −x-axis direction side from the side portion 53. In other words, the light incident surfaces 71 and 72 are disposed on an outside of the light reflecting portion 5.

The laser beam source 9 are disposed in an opposed position to the light incident surfaces 71 and 72 in the +x-axis direction from the side portion 52 and the −x-axis direction from the side portion 53. In other words, each of the laser beam sources 9 is disposed on the outside of the light reflecting portion 5. The laser beam source 9 includes a light emitting portion (not shown). The laser beam source 9 in the +x-axis direction of the side portion 52 is disposed with the light emitting portion turned in the −x-axis direction. In other words, the laser beam source 9 emits a laser beam in the −x-axis direction.

Moreover, the laser beam source 9 in the −x-axis direction of the side portion 53 is disposed with the light emitting portion turned in the +x-axis direction. In other words, the laser beam source 9 emits a laser beam in the +x-axis direction. The laser beam sources 9 are disposed on the +x-axis side of the side portion 52 and the −x-axis side of the side portion 53, and are disposed in a line in the y-axis direction. Each of the laser beam source 9 is disposed on a rear end of the surface light source device 200. In other words, each of the laser beam sources 9 is disposed on a rear end of the liquid crystal display device 100.

In recent years, a white LED is employed as light sources of many liquid crystal display devices. The white LED generates white light having a wide spectrum from a blue color to a red color. The white LED has high light emission efficiency and is effective for reducing power consumption. For this reason, the white LED is employed widely as a light source of a backlight unit in the liquid crystal display device.

A liquid crystal display element of the liquid crystal display device includes a color filter. The liquid crystal display device takes out only respective wavelength ranges for red, green and blue colors by means of the color filter, thereby performing color representation. In the case of a light source having a continuous spectrum with a wide wavelength bandwidth like the white LED, in order to enlarge a color reproduction range, it is necessary to set a transmission wavelength band of light transmitted through the color filter to be narrow and to enhance color purity of a display color. However, the wavelength band of the light transmitted through the color filter is set to be narrow so that a quantity of unnecessary light is increased. In other words, in the liquid crystal display element, utilization efficiency of light is reduced greatly. This causes reduction in a luminance of the display surface of the liquid crystal display element. Furthermore, increase in the power consumption of the liquid crystal display device is caused.

Moreover, a person generally has a high sensitivity to a color difference of the red color. For this reason, a human visual sense feels a difference in a wavelength bandwidth of the red color as a more remarkable difference than a difference in the wavelength bandwidth of other colors. Herein, "a difference in a wavelength bandwidth" indicates a difference in color purity. The white LED to be used as the light source in the conventional liquid crystal display device particularly has a small energy quantity of a spectrum in a red color having a band of 600 nm to 700 nm. In other words, when a color filter having a narrow wavelength bandwidth is used to enhance color purity of a wavelength region of 630 nm to 640 nm which is preferable as pure red, a quantity of transmitted light is decreased so that the utilization efficiency of the light is reduced, resulting in a poorer luminance.

On the other hand, the laser beam emitting element can obtain light having a narrower wavelength bandwidth and higher color purity than those in the white LED. By using the laser beam emitting element as the light source, moreover, it is possible to prevent a loss of a light quantity from being caused by the color filter, thereby increasing the utilization efficiency of the light.

The liquid crystal display device 100 and the surface light source device 200 according to the present preferred embodiment particularly emit red light in three primary colors of light by means of the laser beam source 9 having a high monochromatism. Consequently, a remarkable effect is produced for reduction in power consumption and enhancement in color purity as compared with the case in which light having the other colors is emitted by the laser beam source. Herein, the laser beam source 9 includes a laser beam emitting element.

More specifically, the LED light source 10 is obtained by employing a blue-green LED element in a package including a monochromatic LED element for emitting blue light. The blue-green LED element is filled with a green phosphor for absorbing the blue light and emitting green light. The blue-green LED light source of a simple and small type which can be applied to a display has lower power consumption and a higher output than those in a monochromatic LED light source for emitting the green light or a laser beam source for emitting the green light.

By combining the LED light source 10 having the blue LED element and the green phosphor with the laser beam source 9 for emitting a red laser beam, therefore, it is possible to implement a liquid crystal display device having a wider color reproduction range and lower power consumption than those in the conventional art. The LED light source 10 may include a blue LED element for emitting blue light and a green LED element, for example. In the case in which the LED elements (the blue LED element and the green LED element) are employed for the LED light source 10, however, a power saving effect is poorer than that in the case in which the blue-green LED elements (the blue LED element and the green phosphor) are employed for the LED light source 10.

In a liquid crystal display device using the conventional white LED for a light source, moreover, a wavelength bandwidth of red light emitted from the white LED is greater than that of red light emitted from a laser beam emitting element. For this reason, the conventional liquid crystal display device transmits part of red light through a green filter, thereby reducing color purity of the green color. A spectrum of light transmitted through the green filter is adjacent to a spectrum of the red light. Referring to the liquid crystal display device 100 and the surface light source device 200 according to the present preferred embodiment, the color purity of the red color is increased by the use of the red laser beam source 9. Moreover, a quantity of the red light transmitted through the green filter is reduced by the use of the red laser beam source 9. For this reason, the color purity of the green color is enhanced.

As described above, it is assumed that the LED light source 10 is the LED light source for emitting the blue-green light and the laser beam source 9 is the laser beam source for emitting the red light. However, the structure according to the present invention is not restricted thereto. For example, the LED light source 10 may include an LED element for emitting green light and the laser beam source 9 may include a laser beam emitting element for emitting red color and a laser beam emitting element for emitting blue light. For example, moreover, the LED light source 10 may include an LED element for emitting red light and an LED element for emitting green light, and the laser beam source 9 may include a laser beam emitting element for emitting blue light.

In the case in which a red laser beam emitting element is employed for the laser beam source 9, it is possible to indicate a remarkable difference from the conventional liquid crystal display device in the reduction of the power consumption and the enhancement in the color purity as compared with the case in which the blue laser beam emitting element is employed.

Next, the laser beam guide rod 7 will be described. As shown in FIGS. 2 and 3, the laser beam guide rod 7 is disposed to be turned in the x-axis direction and to be arranged in a plurality of lines at a predetermined interval in the y-axis direction. In each of the laser beam guide rods 7, both end faces in a longitudinal direction are light incident surfaces 71 and 72 (first light incident surfaces). The laser beam sources 9 (more specifically, the light emitting portions of the laser beam sources 9) are disposed at opposed positions to the light incident surfaces 71 and 72, respectively. A laser beam L90 (first light) emitted from the laser beam source 9 toward the light incident surfaces 71 and 72 of the laser beam guide rod 7 is incident on the inner part of the laser beam guide rod 7 from the light incident surfaces 71 and 72.

The laser beam L90 is totally reflected on an interface between the laser beam guide rod 7 and an air layer, and at the same time, is propagated toward a light incident surface at an opposite side to the light incident surface for incidence. In other words, in FIG. 1, the laser beam L90 incident from the light incident surface 72 on the −x-axis side of the laser beam guide rod 7 travels in the +x-axis direction in the inner part of the laser beam guide rod 7. Moreover, the laser beam L90 incident from the light incident surface 71 on the +x-axis side of the laser beam guide rod 7 travels in the −x-axis direction in the inner pat of the laser beam guide rod 7.

The laser beam guide rod 7 is made of a transparent material and a substance (a diffusing material) having a higher refractive index than that of the transparent material, for example. Moreover, the laser beam guide rod 7 is a cylindrical bar-shaped member having a diameter of approximately 3 mm, for example. The laser beam L90 is totally reflected on the interface between the laser beam guide rod 7 and the air layer, and at the same time, is propagated in the inner part of the laser beam guide rod 7. When the laser beam L90 is incident on the diffusing material, however, the laser beam L90 is diffused and reflected by the diffusing material and thus changes its traveling direction. When the traveling direction of the laser beam L90 is changed, some laser beams L90 cannot satisfy a totally reflecting condition on the interface between the front surface of the laser beam guide rod 7 and the air layer. The laser beam L90 which does not satisfy the totally reflecting condition is emitted from the laser beam guide rod 7 in various directions.

In the laser beam guide rod 7, a concentration of the diffusing material contained in the transparent material is adjusted to obtain linear light having uniform intensity distribution in the x-axis direction of the laser beam L90 emitted from the laser beam guide rod 7. Herein, an acrylic resin (Polymethyl methacrylate: PMMA) or the like is employed for the transparent material, for example. The laser beam L90 is converted into linear light (first linear light) extended in the x-axis direction by the laser beam guide rod 7.

The laser beam L90 emitted in a +z-axis direction from the light incident surface 72 of the laser beam guide rod 7 is reflected by the reflecting bar 6 and the traveling direction thereof is changed into a −z-axis direction. The laser beam L90 traveling in the −z-axis direction reaches a back portion 51 of the light reflecting portion 5, and is diffused and reflected by a reflecting surface 57 and thus spreads in a y-axis direction. By the spread in the y-axis direction, the laser beam L90 spatially overlaps with light emitted from the adjacent laser beam guide rod 7. When the laser beam L90 emitted in such a direction as not to reach the reflecting bar 6 reaches the back portion 51 and side portions 52, 53, 54 and 55 while spreading in the light reflecting portion 5, moreover, it is diffused and reflected by the reflecting surface 57 and thus spreads.

As described above, the laser beam L90 is changed into linear light extended in the longitudinal direction (the x-axis direction) of the laser beam guide rod 7 by means of the laser beam guide rod 7. Then, the linear light spreads in the arranging direction (the y-axis direction) of the laser beam guide rod 7 by means of the reflecting bar 6 and overlaps with light emitted from the adjacent laser beam guide rod 7, and is thus changed into planar light for illuminating the back surface of the liquid crystal panel 1.

Next, the LED light guide rod 8 will be described with reference to FIGS. 1, 3 and 4. FIG. 4 is a schematic view schematically showing a structure of the LED light guide rod 8. The LED light guide rod 8 is made of a transparent material such as an acrylic resin (PMMA) and a substance (a diffusing material) having a higher refractive index than that of the transparent material, for example. Moreover, the LED light guide rod 8 is shaped to include a light incident surface 81 (a second light incident surface), a reflecting surface 82, a microstructure 83, and an emitting surface 84 on a prismatic bar of approximately 5 mm square, for example.

The LED light guide rod 8 is disposed in a close position to the −z-axis direction from the laser beam guide rod 7. More specifically, the LED light guide rod 8 is disposed to be turned in the x-axis direction and to be arranged in a plurality of lines at a predetermined interval in the y-axis direction. Moreover, three LED light guide rods 8 are disposed at predetermined intervals in the x-axis direction with respect to the laser beam guide rods 7.

The light incident surface 81 is a surface formed along a transverse direction (the y-axis direction) of each of the LED light guide rods 8 at an opposite side to the emitting side of the light reflecting portion 5. More specifically, the light incident surface 81 is provided on a surface at the −z-axis direction side of the LED light guide rod 8. Similarly, the microstructure 83 is also provided on a surface at the −z-axis direction side of the LED light guide rod 8. Moreover, the reflecting surface 82 and the emitting surface 84 are provided on the surface at the +z-axis direction side of the LED light guide rod 8.

The LED light source 10 is disposed in the −z-axis direction from the LED light guide rod 8 on the back portion 51 of the light reflecting portion 5. The LED light source 10 (more specifically, the light emitting portion of the LED light source 10) is disposed in a close position to the −z-axis direction of the light incident surface 81 of the LED light guide rod 8. An LED light L100 incident from the light incident surface 81 of the LED light guide rod 8 is propagated in the +z-axis direction and is divided into light propagated in the +x-axis direction and the −x-axis direction through the reflecting surface 82.

The LED light L100 is totally reflected on the interface between the LED light guide rod 8 and the air layer, and at the same time, is propagated in the +x-axis direction or the −x-axis direction. Some light traveling in the +x-axis direction or the −x-axis direction which is incident on the microstructure 83 changes its traveling direction. When the traveling direction of the LED light L100 is changed, some LED light cannot satisfy a totally reflecting condition on the interface between the front surface of the LED light guide rod 8 and the air layer. The LED light L100 (light traveling in the +z-axis direction) which does not satisfy the totally reflecting condition is emitted from the emitting surface 84 of the LED light guide rod 8 in the +z-axis direction.

The light incident surface 81 and the reflecting surface 82 in the LED light guide rod 8 have a structure for dividing the LED light L100 into light propagated in the +x-axis direction and the −x-axis direction in the LED light guide rod 8. Moreover, a shape, an arrangement position, and an arrangement density of the microstructure 83 are determined in such a manner that the light emitted from the emitting surface 84 is changed into linear light having uniform intensity distribution in the x-axis direction. For example, the shapes of the light incident surface 81, the reflecting surface 82, and the microstructure 83 have a prism structure extended in the y-axis direction. The LED light L100 is converted into linear light (second linear light) extended in the x-axis direction by the LED light guide rod 8. The shapes of the light incident surface 81, the reflecting surface 82, and the microstructure 83 are not restricted to the prism structure, but may take such shapes as to enable performance of the functions described above.

The LED light L100 emitted in the +z-axis direction from the emitting surface 84 of the LED light guide rod 8 is reflected by the reflecting bar 6 and a traveling direction thereof is changed into the −z-axis direction as shown in FIG. 3. The LED light L100 traveling in the −z-axis direction reaches the back portion 51 of the light reflecting portion 5, and is diffused and reflected by the back portion 51 and thus spreads in the y-axis direction. By the spread in the y-axis direction, the LED light L100 can spatially overlap with light emitted from the adjacent laser beam guide rod 7.

The LED light L100 is changed into linear light extended in the longitudinal direction (the x-axis direction) of the LED light guide rod 8 by means of the laser beam guide rod 7. Then, the linear light spreads in the arranging direction (the y-axis direction) of the LED light guide rod 8 by means of the reflecting bar 6, overlaps with light emitted from the adjacent LED light guide rod 8 and is changed into planar light for illuminating the back surface of the liquid crystal panel 1. Thus, the linear light obtained by converting the laser beam L90 and the linear light obtained by converting the LED light L100 are reflected by the reflecting bar 6 and the reflecting surface 57 of the light reflecting portion 5 and are emitted from an opening portion 56.

As described above, the reflecting bar 6 serves to cause the laser beam L90 and the LED light L100 changed into the linear light extended in the x-axis direction by the laser beam guide rod 7 and the LED light guide rod 8 to spread in the y-axis direction. Furthermore, the reflecting bar 6 is placed in a close position to the laser beam guide rod 7 and is disposed right in front of the laser beam guide rod 7, and the laser beam L90 and the LED light L100 are reflected by the same reflecting bar 6. By disposing the reflecting bar 6 in the close position to the laser beam guide rod 7, the red laser beam L90 and the blue-green LED light L100 emitted from the laser beam guide rod 7 and the LED light guide rod 8 are color-mixed before they spread at divergence angles possessed by the respective light sources, thereby generating white color light.

By disposing the reflecting bar 6 close to the laser beam guide rod 7, moreover, it is possible to minimize a width in the y-axis direction of the reflecting bar 6. The width of the reflecting bar 6 (the width in the y-axis direction) is designed in such a manner that the laser beam L90 and the LED light L100 have the same intensity distribution in the display surface 1a of the liquid crystal panel 1 based on an arrangement interval in the y-axis direction of the laser beam guide rod 7 or the LED light guide rod 8 and a distance between the back portion 51 and the opening portion 56. It is desirable that the reflecting bar 6 should be a member having a high reflectance such as a light reflecting sheet or a mirror.

Next, a control system of the liquid crystal display device 100 will be described with reference to FIG. 5. FIG. 5 is a block diagram showing the liquid crystal display device 100. By individually controlling a quantity of light emission of the LED light source 10 and a quantity of light emission of the laser beam source 9, it is possible to reduce power consumption. The liquid crystal panel driving unit 32 drives the liquid crystal panel 1. The LED light source driving unit 33a drives the LED light source 10. The laser beam source driving unit 33b drives the laser beam source 9. The control unit 31 controls the liquid crystal panel driving unit 32, the LED light source driving unit 33a, and the laser beam source driving unit 33b.

For example, the control unit 31 individually controls the LED light source driving unit 33a and the laser beam source driving unit 33b, thereby enabling regulation of a rate of a quantity of blue-green light emitted from the LED light source 10 and a quantity of red light emitted from the laser beam source 9. A rate of light intensities of necessary respective colors is varied in response to a video signal input to the control unit 31. By regulating a quantity of light emission from each light source corresponding to the video signal, it is possible to implement reduction in the power consumption.

The LED element and the laser beam emitting element are light sources having different characteristics from each other. In particular, the LED element and the laser beam emitting element have divergence angles of emitted light (angle intensity distribution) which are greatly different from each other. Specifically, the LED light has a greater divergence angle than that of a laser beam. In other words, the laser beam has a smaller divergence angle and a higher straightness than those of the LED light. For this reason, the laser beam L90 can be incident on the laser beam guide rod 7 with a small loss in the incidence on the laser beam guide rod 7. In the present preferred embodiment, the laser beam source 9 and the light incident surfaces 71 and 72 of the laser beam guide rod 7 are disposed on the outside of the light reflecting portion 5. However, the laser beam having the small divergence angle can be incident on the laser beam guide rod 7 with a small loss. Therefore, much light can be used for display.

Moreover, the LED element and the laser beam emitting element have different light emission efficiencies for heat (temperature) from each other. In particular, the laser beam emitting element has an emission light quantity and a wavelength which are easily varied depending on the temperature. For this reason, in the case in which the LED element and the laser beam emitting element are similarly disposed side by side on the back surface side of the display surface as in a general directly under type liquid crystal display device, for example, it is difficult to separate heat generated from the LED element. Thus, the heat generated by the LED element influences the light emission of the laser beam emitting element. Accordingly, it is desirable that a heat source should not be disposed close to the laser beam emitting element. In the present preferred embodiment, the LED light source 10 is disposed on the inside of the back portion 51 of the light reflecting portion 5 and the laser beam source 9 is disposed on the outside of the side portions 52 and 53 of the light reflecting portion 5. Thus, the LED light source 10 and the laser beam source 9 are disposed apart from each other, thereby obtaining a structure in which the LED light source 10 and the laser beam source 9 are less likely to be influenced by the mutual heat.

As the laser beam source 9, for example, a semiconductor laser is employed. The semiconductor laser has a fast axis direction having a great divergence angle and a slow axis direction having a small divergence angle based on a structure thereof. The slow axis direction is orthogonal to the fast axis direction. In an array of the laser beam source 9 according to the present preferred embodiment, the fast axis direction is parallel with an array direction (the y-axis direction) of the laser beam emitting element. Moreover, the slow axis direction is parallel with a thickness direction (the z-axis direction) of the liquid crystal display device 100.

The laser beam source 9 is disposed in such a manner that the fast axis direction is parallel with the array direction (the y-axis direction) of the laser beam emitting element. Consequently, the laser beam L90 emitted from the laser beam guide rod 7 spreads still largely in the y-axis direction. For this reason, the laser beam L90 emitted from the laser beam guide rod 7 is easily mixed with the laser beam L90 emitted from the adjacent laser beam guide rod 7 in the light reflecting portion 5. Moreover, the laser beam source 9 is disposed in such a manner that the fast axis direction is parallel with the array direction (the y-axis direction) of the laser beam emitting element. Consequently, a thickness of the light reflecting portion 5 (the z-axis direction) can also be reduced. However, the arrangement direction of the laser beam emitting element is not restricted thereto.

Moreover, the laser beam guide rod 7 is set to be a cylindrical bar-shaped member having a diameter of approximately 3 mm. However, the present invention is not restricted thereto. For example, it is also possible to use a prism-shaped member having a square end face. Moreover, it is also possible to use a bar-shaped member having a rectangular or elliptical end face. In the case in which the end face takes a rectangular or elliptical shape, however, it is desirable that a long side of a rectangle and a major axis of an ellipse should be disposed in parallel with the fast axis direction of the laser beam emitting element.

Furthermore, there is employed a structure in which the light reflecting portion 5 is tilted with respect to the back portion 51 which is parallel with the x-y plane and the side portions 52, 53, 54 and 55 are tilted with respect to the x-y plane. By such a structure, the laser beam L90 and the LED light L100 incident on the tilted side portions 52, 53, 54 and 55 are reflected in the +z-axis direction. Therefore, a peripheral part of the display surface 1a of the liquid crystal panel 1 can be bright. By providing the tilted side portions 52 and 53, moreover, it is possible to dispose the laser beam source 9 on the back surface side (the −z-axis direction side) of the diffusing plate 4 as shown in FIG. 1. Consequently, a bezel can be narrowed.

Herein, the disposition of the laser beam source 9 on the back surface side of the diffusing plate 4 implies that the laser beam source 9 is not protruded outward from the end face in the x-axis direction of the diffusing plate 4. Alternatively, it is indicated that the laser beam source 9 is only partially protruded outward from the end face in the x-axis direction of the diffusing plate 4.

Figure 6:
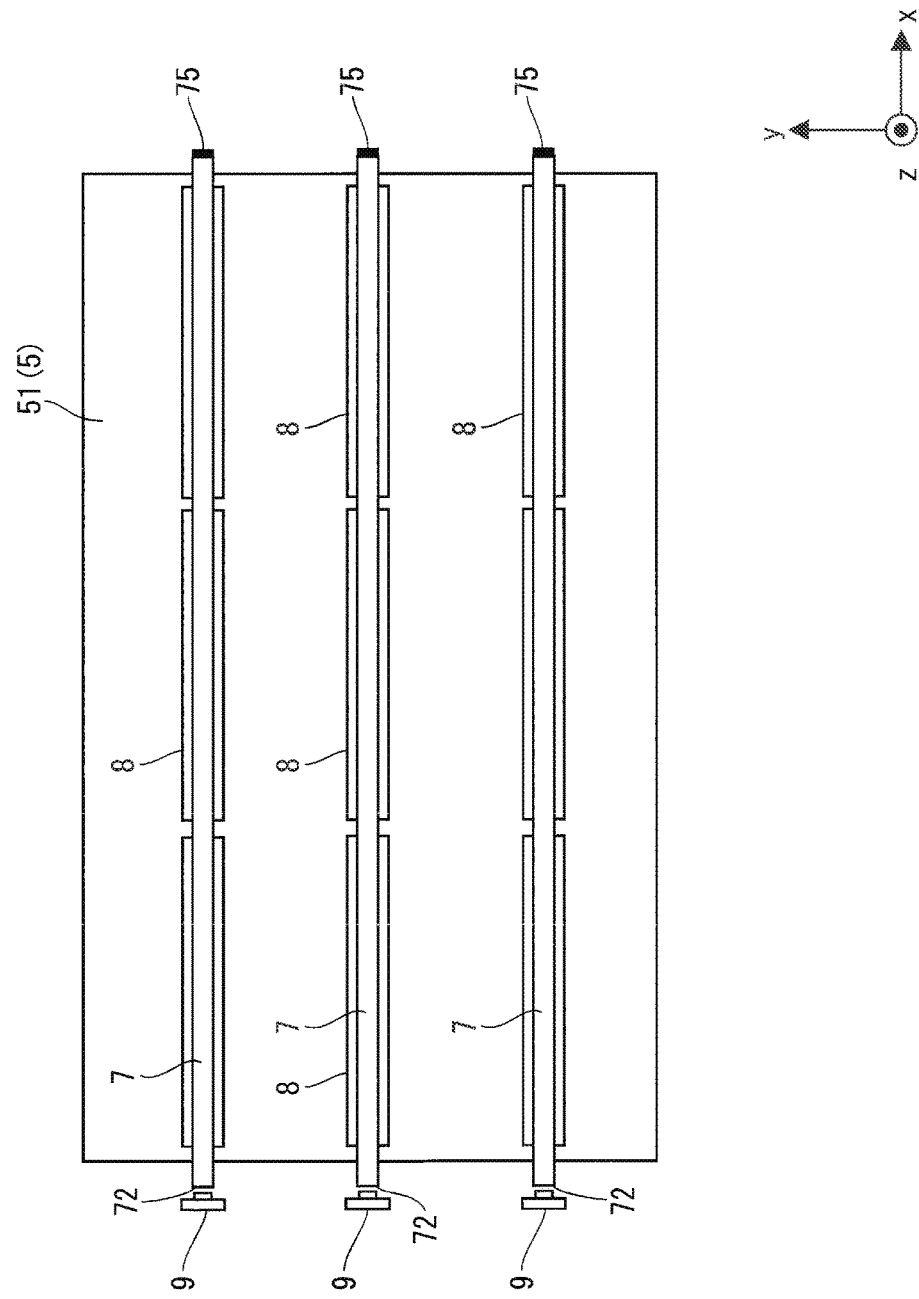
FIG. 6 is a configuration view schematically showing another example of the structure of the surface light source device.

Moreover, the laser beam source 9 is disposed opposite to an end face in the −x-axis direction and an end surface in the +x-axis direction in the laser beam guide rod 7. However, the present invention is not restricted thereto. For example, as shown in FIG. 6, one of the end faces of the laser beam guide rod 7 (the end face in the −x-axis direction in FIG. 6) may be set to be the light incident surface 72 and the other end face (the end face in the +x-axis direction in FIG. 6) may be set to be the reflecting surface 75. FIG. 6 is a configuration view schematically showing another example of the structure of the surface light source device 200. The reflecting surface 75 is made of a member having a high reflectance, for example, a mirror or a reflecting sheet. In this case, it is necessary to regulate a concentration of a diffusing agent in the laser beam guide rod 7 in such a manner that a laser beam incident from the light incident surface 72 is propagated in the laser beam guide rod 7 and is reflected by the reflecting surface 75, thereby obtaining linear light having a uniform intensity.

Figure 7:
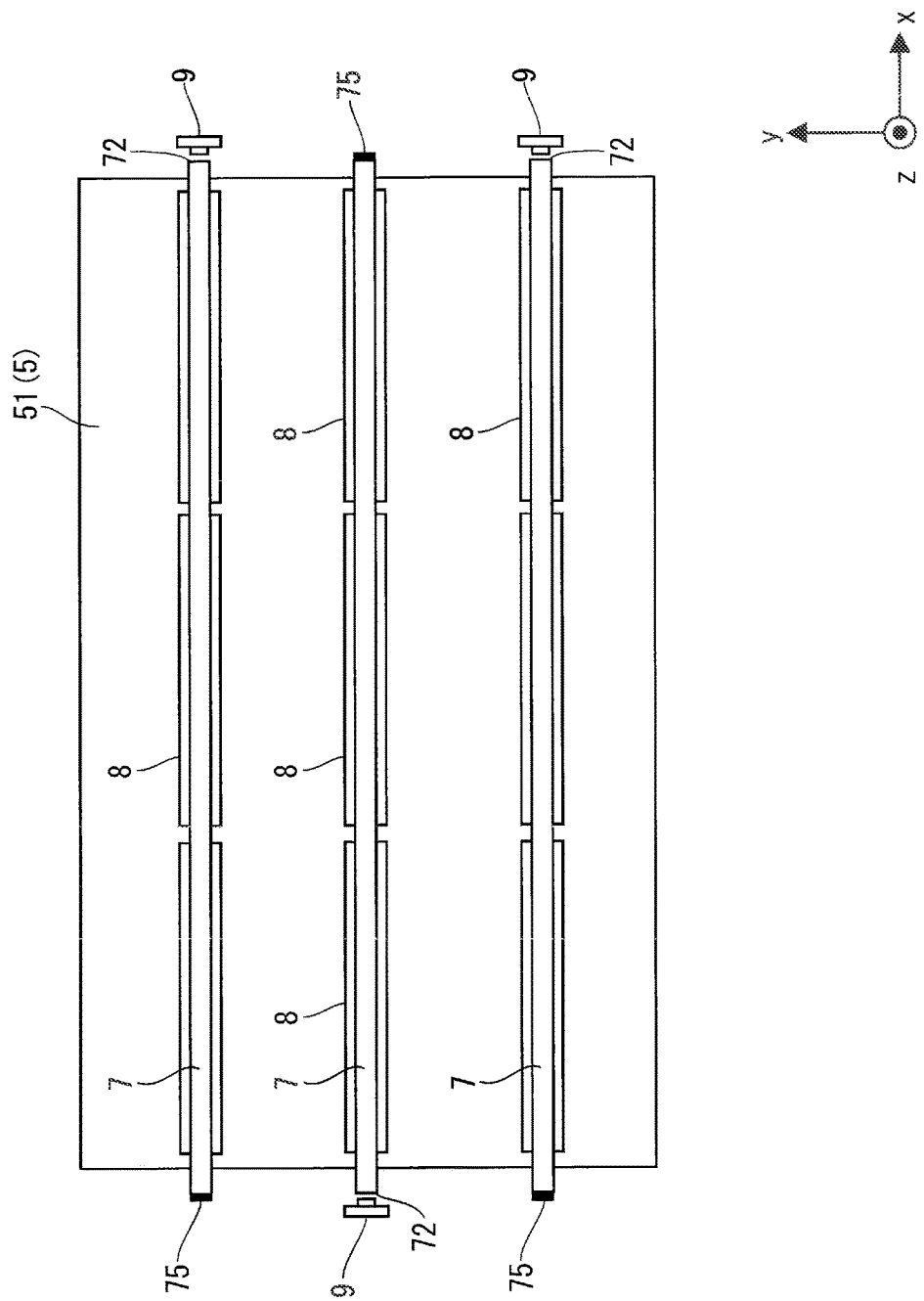
FIG. 7 is a configuration view schematically showing a still another example of the structure of the surface light source device.

Moreover, in the laser beam guide rods 7, the light incident surfaces 72 may alternately be disposed in the −x-axis direction and the +x-axis direction as shown in FIG. 7. FIG. 7 is a configuration view schematically showing a still another example of the structure of the surface light source device 200. More specifically, end faces of the laser beam guide rods 7 (the end faces in the −x-axis direction in FIG. 7) may be set to be the reflecting surface 75, the light incident surface 72 and the reflecting surface 75, and the other end faces (the end faces in the +x-axis direction in FIG. 7) may be set to be the light incident surface 72, the reflecting surface 75 and the light incident surface 72 in order from a positive direction to a negative direction of the y axis.

Figure 8:
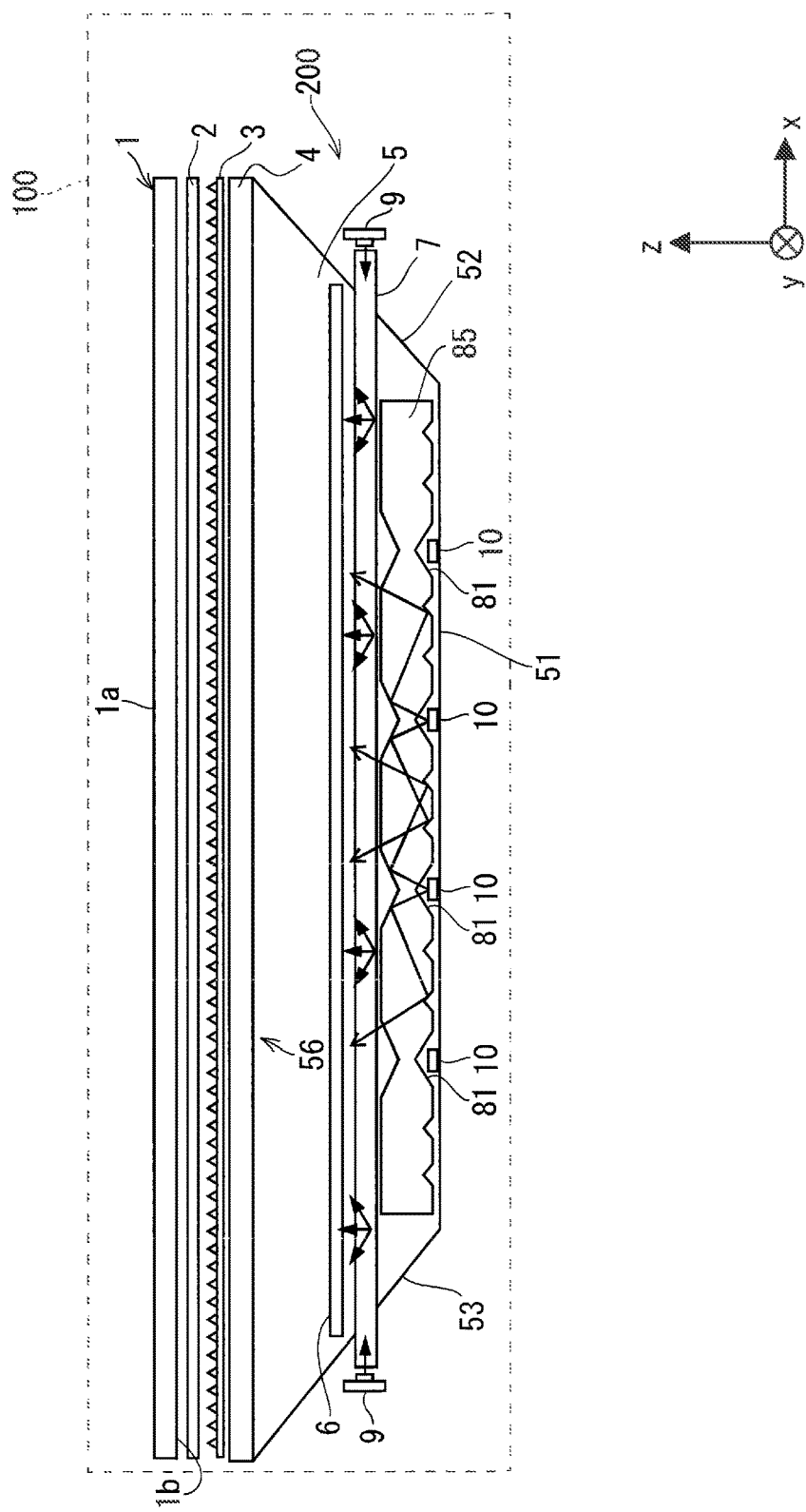
FIG. 8 is a configuration view schematically showing another example of the structure of the liquid crystal display device.

Moreover, each LED light guide rod 8 is set to have a structure in which the light incident surface 81 is provided in only one place. However, the present invention is not restricted thereto. For example, the light incident surface 81 may be provided in a plurality of places as in the LED light guide rod 85 in FIG. 8. FIG. 8 is a configuration view schematically showing another example of the structure of the liquid crystal display device 100.

In the present preferred, embodiment, the description has been given on the assumption that the LED light source 10 includes an LED element for emitting blue-green light and the laser beam source 9 includes a laser beam emitting element for emitting red light. However, the structure according to the present invention is not restricted thereto. For example, the LED light source 10 may include an LED element for emitting green light and the laser beam source 9 may include a laser beam emitting element for emitting red light and a laser beam emitting element for emitting blue light. Furthermore, the LED light source 10 may include an LED element for emitting red light and an LED element for emitting green light, and the laser beam source 9 may include a laser beam emitting element for emitting blue light, for example.

In the case in which a red laser beam emitting element is employed as the laser beam source 9, it is possible to indicate a remarkable difference from the conventional liquid crystal display device in reduction in power consumption and enhancement in color purity as compared with the case in which a blue laser beam emitting element is employed.

As described above, in the surface light source device 200 according to the preferred embodiment, the laser beam L90 emitted from the laser beam source 9 is converted into linear light by the laser beam guide rod 7 and the LED light L100 emitted from the LED light source 10 is converted into linear light extended in the same direction as the linear light obtained by converting the laser beam L90 through the LED light guide rod 8. The linear light obtained by converting the laser beam L90 and the linear light obtained by converting the LED light L100 are reflected by the reflecting bar 6 and thus spread. Therefore, illumination light in uniform planar distribution can be obtained. Moreover, the linear light obtained by converting the laser beam L90 and the linear light obtained by converting the LED light L100 are reflected by the reflecting bar 6, and spread with color mixture in the light reflecting portion 5. For this reason, it is possible to prevent color unevenness from being caused by a difference in the intensity distribution between the laser beam L90 and the LED light L100.

When simultaneously using two types of light sources having different light emission characteristics from each other, thus, it is possible to guide the light emitted from the laser beam source 9 and the LED light source 10 without waste. Therefore, the utilization efficiency of the light can be increased so that an image of high quality can be displayed. Moreover, the display of the image of high quality can be implemented with a simple structure.

The liquid crystal display device 100 includes the surface light source device 200 and the liquid crystal panel 1 for displaying an image by illumination of light from the surface light source device 200. When simultaneously employing two types of light sources having different light emission characteristics, therefore, it is possible to guide the light emitted from the laser beam source 9 and the LED light source 10 without waste. Consequently, the utilization efficiency of the light can be increased so that the image of high quality can be displayed. Moreover, it is possible to implement the display of the image of high quality with a simple structure.

Moreover, the laser beam source is employed as the first light source. The laser beam source has a narrower wavelength bandwidth than that of the white LED light source and can give light having high color purity. Therefore, it is possible to obtain a wider color reproduction range than the surface light source device including the conventional white LED light source. Moreover, the laser beam source is employed as the first light source. Therefore, it is possible to suppress a loss of a light quantity in a color filter, thereby enhancing the utilization efficiency of the light.

Furthermore, the LED light source is employed as the second light source. In the case in which the blue-green LED light source is employed, it is possible to obtain lower power consumption and a higher output than those in a monochromatic LED light source for emitting green light or a laser beam source for emitting the green light.

The laser beam guide rod 7 is held on the light reflecting portion 5 with the ends of the laser beam guide rod 7 protruded outward, the laser beam source 9 and the light incident surfaces 71 and 72 are disposed on the outside of the light reflecting portion 5, and the LED light source 10 and the LED light guide rod 8 are disposed on the inside of the light reflecting portion 5. Thus, the LED light source 10 and the laser beam source 9 are disposed apart from each other, thereby obtaining a structure in which the LED light source 10 and the laser beam source 9 are less likely to be influenced by the mutual heat.

The laser beam guide rod 7 is made of a transparent material and a diffusing material having a higher refractive index than that of the transparent material, and diffuses, reflects and emits the incident laser beam L90. Therefore, the incident laser beam L90 spreads in the longitudinal direction (the x-axis direction) of the laser beam guide rod 7 so that the laser beam L90 can be converted into linear light extended in the x-axis direction.

The laser beam guide rod 7 is disposed on the opening portion 56 side from the LED light guide rod 8, and the reflecting bar 6 is disposed on the opening portion 56 side from the laser beam guide rod 7. For this reason, the linear light emitted from the laser beam guide rod 7 and the linear light emitted from the LED light guide rod 8 are reflected toward the reflecting surface 57 on the inside of the light reflecting portion 5 by the reflecting bar 6. Consequently, the linear light emitted from the laser beam guide rod 7 and the linear light emitted from the LED light guide rod 8 overlap with each other and can be thus converted into planar light for illuminating the back surface 1b of the liquid crystal panel 1.

While the invention has been shown and described in detail, the foregoing description is in all aspects illustrative and not restrictive. It is therefore understood that numerous modifications and variations can be devised without departing from the scope of the invention.

What is claimed is:
1. A surface light source device comprising:
a first light source for emitting first light;
a first light guide rod having a first light incident surface and causing said first light to be incident from said first light incident surface and converting said first light into first linear light;
a second light source for emitting second light having a greater divergence angle than that of said first light;
a second light guide rod having a second light incident surface and causing said second light to be incident from said second light incident surface and converting said second light into second linear light extended in the same direction as said first linear light;
a reflecting bar disposed on emission sides of said first light guide rod and said second light guide rod and reflecting said first linear light and said second linear light; and
a reflecting portion being formed in a box shape such that said first light guide rod, said second light source, said second light guide rod, and said reflecting bar can be accommodated, and having an opening portion with said emission side opened and a reflecting surface for reflecting said first linear light and said second linear light on an inside of said box shape,
wherein said first light incident surface is an end face in a longitudinal direction of said first light guide rod,
said first light source is disposed in an opposed position to said first light incident surface,
said second light incident surface is a surface formed along a longitudinal direction of said second light guide rod at an opposite side to said emission side,
said second light source is disposed in an opposed position to said second light incident surface, and
said first linear light and said second linear light are reflected by said reflecting bar and said reflecting surface, and are emitted from said opening portion.
2. The surface light source device according to claim 1, wherein said first light guide rod is held on said reflecting portion with ends of said first light guide rod protruded outward, said first light source and said first light incident surface are disposed on an outside of said reflecting portion, and said second light source and said second light guide rod are disposed on an inside of said reflecting portion.

3. The surface light source device according to claim 1, wherein said first light guide rod is disposed on said opening portion side from said second light guide rod, and said reflecting bar is disposed on said opening portion side from said first light guide rod.

4. The surface light source device according to claim 1, wherein said first light guide rod is made of a transparent material and a diffusing material having a higher refractive index than that of said transparent material and diffuses, reflects and emits said incident first light.

5. The surface light source device according to claim 1, wherein said first light source is a laser beam source.

6. The surface light source device according to claim 1, wherein said second light source is an LED light source.

7. A liquid crystal display device comprising:

the surface light source device according to claim 1; and a liquid crystal panel for displaying an image by illumination of light from said surface light source device.

* * * * *